United States Patent
Spertus et al.

(10) Patent No.: US 8,230,500 B1
(45) Date of Patent: Jul. 24, 2012

(54) METHODS AND SYSTEMS FOR DETECTING ROOTKITS

(75) Inventors: Michael Spertus, Wilmette, IL (US); Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 917 days.

(21) Appl. No.: 12/163,731

(22) Filed: Jun. 27, 2008

(51) Int. Cl.
*G06F 12/14* (2006.01)
*G06F 11/00* (2006.01)

(52) U.S. Cl. ............... 726/22; 726/23; 726/24; 726/25; 713/188; 709/201; 709/202; 709/217; 709/218

(58) Field of Classification Search ............... 726/22
See application file for complete search history.

(56) References Cited

U.S. PATENT DOCUMENTS

| | | | | |
|---|---|---|---|---|
| 7,577,998 B1* | 8/2009 | Crosbie et al. | | 726/27 |
| 7,631,357 B1* | 12/2009 | Stringham | | 726/24 |
| 7,665,123 B1* | 2/2010 | Szor et al. | | 726/2 |
| 7,904,278 B2* | 3/2011 | Wilson et al. | | 702/186 |
| 7,945,787 B2* | 5/2011 | Gassoway | | 713/188 |
| 2005/0076237 A1* | 4/2005 | Cohen et al. | | 713/201 |
| 2008/0015808 A1* | 1/2008 | Wilson et al. | | 702/123 |
| 2008/0109906 A1* | 5/2008 | Sallam | | 726/24 |
| 2008/0320594 A1* | 12/2008 | Jiang | | 726/24 |
| 2009/0172816 A1* | 7/2009 | Maino et al. | | 726/24 |
| 2009/0217377 A1* | 8/2009 | Arbaugh et al. | | 726/23 |
| 2011/0047618 A1* | 2/2011 | Evans et al. | | 726/23 |

OTHER PUBLICATIONS

Wang, Y., et al, 'Detecting Stealth Software with Strider GhostBuster', 2005, IEEE, 2005 Intl. Confr. on Dependable Systems and Networks, entire document, http://vx.netlux.org/lib/pdf/Detecting%20Stealth%20 Software%20with% 20Strider%20 GhostBuster.pdf.*
Wang, Z., et al, 'Countering Persistent Kernel Rootkits Through Systematic Hook Discovery', Proceedings of the Recent Advances in Intrusion Detection (RAID), 2008, entire document, http://www.csc.ncsu.edu/faculty/jiang/pubs/RAID08_HookMap.pdf.*
"AK922: Bypassing Disk Low Level Scanning to Hide File," Rootkit, http://www.rootkit.com/newsread.php?newsid=783, Oct. 28, 2008.

* cited by examiner

*Primary Examiner* — Christian LaForgia
*Assistant Examiner* — Ronald Baum
(74) *Attorney, Agent, or Firm* — Advantedge Law Group (57) ABSTRACT

A computer-implemented method for detecting rootkits. The method may include identifying, from a control platform, a first directory listing. The first directory listing may be associated with a file system. The method may include identifying, from a target platform, a second directory listing. The second directory listing may be associated with the file system. The target platform and the control platform may be running concurrently on a computing device. The method may also include detecting a discrepancy between the first directory listing and the second directory listing and determining that the discrepancy is a result of the target platform being infected with a rootkit. Various other methods, systems, and computer-readable media are also disclosed.

20 Claims, 6 Drawing Sheets

METHODS AND SYSTEMS FOR DETECTING ROOTKITS

BACKGROUND

Rootkits may be programs that use system hooking or modification to hide files, processes, registry keys, and other objects in order to hide programs and behaviors. Rootkits may attempt to take control of a computing device without the device owner's authorization. Rootkit code may have the ability to bypass security applications and tools used to discover the existence of intruders and malicious programs.

Rootkits can be difficult to detect and remove. Security software companies have implemented various technologies to detect and remove rootkits. For example, security software may use volume mapping technology to discover rootkits. The security software may compare a directory listing at the operating system level with a directory listing made by interpreting a master-file table. Differences between the two listings may suggest that a rootkit is present on the device.

For example, if WINDOWS EXPLORER shows two files in a directory and a volume mapping service (e.g. VxMS) shows four files in the directory, the additional two files may be cloaked. The cloaked files may be analyzed to determine whether they are part of a rootkit. If the files are part of a rootkit, the rootkit may be removed.

Some new rootkits are designed to evade detection by even the most advanced security software, including security software that implements techniques using volume mapping. These rootkits may evade detection by stealthing the volume. When rootkits go undetected, they may be able to collect confidential information such as user identification data, account numbers, and passwords. Furthermore, ready-to-use rootkit applications may be widely available on the Internet, giving inexperienced hackers the ability to use a rootkit without having to understand how it works. What is needed, therefore, is a more robust way to detect the presence of a rootkit on a system.

SUMMARY

The present disclosure presents various methods and systems for detecting rootkits. In some embodiments, a security module may identify a first directory listing from a control platform running on a computing device. The first directory listing may be associated with the file system. The security module may also identify a second directory listing from a target platform running on the same computing device. The second directory listing may also be associated with the file system. The control platform and the target platform may run concurrently on the computing device.

The security module may compare the first and second directory listings and detect a discrepancy between the two directory listings. The security module may determine that the discrepancy is a result of one the target platform being infected with a rootkit. The security module may then remove the rootkit and/or perform any other suitable security measures with respect to the rootkit.

The control platform may be a host operating system and the target platform may be a guest operating system. In some embodiments, the control platform may be a hypervisor and the target platform may be a virtual machine managed by the hypervisor. The control platform may be a secure platform that runs directly on hardware of the computing device, and the target platform may be an insecure operating system that communicates with the hardware of the computing device through the control platform. In some embodiments, both the control platform and the target platform may be virtual machines.

In some embodiments, the discrepancy between the first directory listing and the second directory listing may be that the first directory listing identifies a file that is not found in the second directory listing, suggesting that the file is being cloaked from the target platform. In other embodiments, the discrepancy between the first directory listing and the second directory listing may be that a hash for a first file in the first directory listing does not match a hash for the first file in the second directory listing.

In other embodiments, a security module may attempt to detect a rootkit by identifying a first table of a volume through a control platform. The control platform may be running on a first computing device. The security module may also identify a second file table of the volume through a target platform running on the same computing device. The security module may detect a discrepancy between the first and second file tables and may determine that the discrepancy is the result of the target platform being infected with a rootkit. After detecting that a platform is infected with a rootkit, the security module may remove the rootkit and report the rootkit to a security software company. In some embodiments, the volume may comprise an NTFS-formated volume, and the first and second file tables may be master-file tables. According to various embodiments, the discrepancy may be a result of a rootkit manipulating an attempt to read the volume.

Some embodiments may combine directory-listing based detection and file-table based detection. For example, the security module may use the first file table to create a first directory listing. The security module may compare the first directory listing with a second directory listing obtained through the target platform. In various embodiments, the security module may use the second file table to create a second directory listing. The security module may compare the second directory listing with a first directory listing obtained through the control platform.

Various other methods, systems, and computer-readable media are disclosed herein. In addition, features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to systems and methods for detecting rootkits. In some embodiments, a security module may compare directory listing from different platforms to determine whether there are discrepancies between the directory listings. If there is a discrepancy, the security module may determine whether the discrepancy is a result of the target platform being infected with a rootkit. In various embodiments, a security module may identify file tables of a volume through different platforms. The security module may detect discrepancies between the file tables and determine that the discrepancies are a result of the target platform being infected with a rootkit. The methods and systems disclosed herein may provide more robust mechanisms for detecting rootkits than previous systems. For example, embodiments of the instant disclosure may be able to detect rootkits that stealth a volume. As will be discussed in greater detail below, embodiments of the instant disclosure may provide various other features and advantages.

Figure 1:
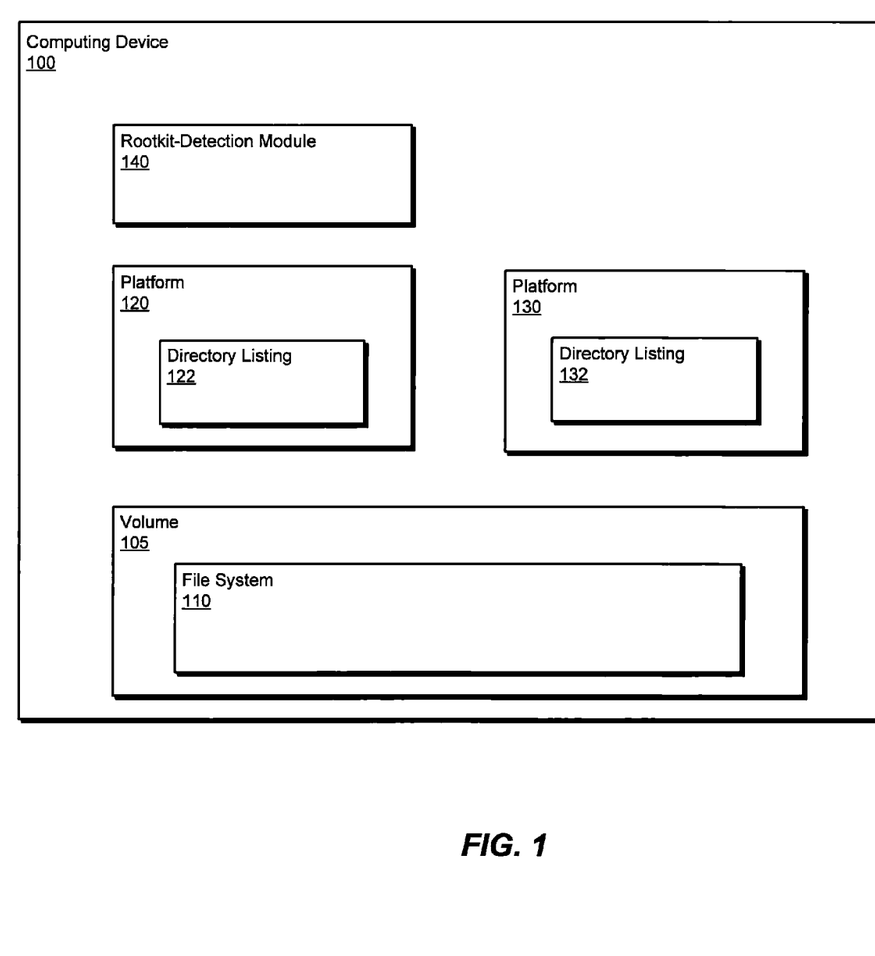
FIG. 1 is a block diagram of an exemplary computing device according to certain embodiments.

FIG. 1 shows a computing device 100. Computing device 100 may be a desktop computer, a laptop computer, a workstation, a mobile computing device, or any other suitable computing device. Two platforms, platform 120 and platform 130, may be running on computing device 100. Both platforms 120 and 130 may have access to a volume 105 and files in a file system 110 of volume 105. Computing device 100 may also include a rootkit-detection module 140.

Rootkit-detection module 140 may be any module, application, or other computer-executable code programmed to detect rootkits. For example, rootkit-detection module 140 may identify a directory listing 122 in platform 120. Directory listing 122 may be a list of files names and directory names of one or more directories in file system 110. Rootkit-detection module 140 may also identify a directory listing 132 in platform 130. Like directory listing 122, directory listing 132 may be a listing of file names and/or directory names of one or more directories in file system 110.

Rootkit-detection module 140 may compare directory listing 122 with directory listing 132. If directory listing 122 does not match directory listing 132, rootkit-detection module may look further into this discrepancy. Rootkit-detection module 140 may determine that the discrepancy is the result of either platform 120 or platform 130 being infected with a rootkit. For example, rootkit-detection module 140 may determine that platform 130 is infected with a rootkit. Rootkit-detection module 140 may then perform appropriate steps to remove the rootkit and/or take other security measures with respect to the rootkit.

In other embodiments, instead of using directory listings 122 and 132, rootkit-detection module 140 may use a file tables of volume 105 to determine whether one of platforms 120 and 130 is infected with a rootkit. For example, rootkit-detection module 140 may access a first file table of volume 105 through platform 120. Rootkit-detection module 140 may also access a second file table volume 105 through platform 130. The first and second file tables may both represent the same volume, volume 105. However, if a rootkit installed on platform 130 is stealthing the volume, the rootkit may be able to cause platform 130 to return a file table that does not accurately represent the files of volume 105.

For example, the rootkit may be able to hide files from the attempt to map the volume. Thus, the file table accessed through platform 120 may be different than the file table accessed through platform 130, even though the file tables represent the same volume 105. Rootkit-detection module 140 may detect this discrepancy between the file tables and may determine that the discrepancy is the result of one of platforms 120 and 130 being infected with a rootkit.

FIG. 1 shows rootkit-detection module 140 installed on computing device 100. In other embodiments, rootkit-detection module 140 may run remotely on a security server or any other network device. In some embodiments, rootkit-detection module 140 may be part of a security software solution or network security solution.

Volume 105 may be a single accessible storage area within a single file system. Typically, volume 105 may reside on a single partition of a hard disc of computing device 100. File system 110 may be any suitable file system for storing and organizing computer files. File system 110 may maintain the physical location of the files and may provide access to the data on volume 105. Examples of file systems include the New Technology File System (NTFS), the File Allocation Table (FAT) file system, and various other types of file systems.

Platforms 120 and 130 may be any type of software platform programmed to provide access to data on volume 105. For example, platform 120 may be a host operating system and platform 130 may be a guest operating system. In some embodiments, platform 120 may be a hypervisor and platform 130 may be a virtual machine managed by the hypervisor. In other embodiments, both platforms 120 and 130 may be virtual machines. In some embodiments, platform 120 and/or 130 may comprise an operating system, such as a Windows operating system (e.g., WindowXP, Window Vista, etc.), a Macintosh operating system (e.g., MacOS10), a Unix operating system (e.g., AIX, Solaris), a Linux operating system, or any other suitable operating system.

Figure 2:
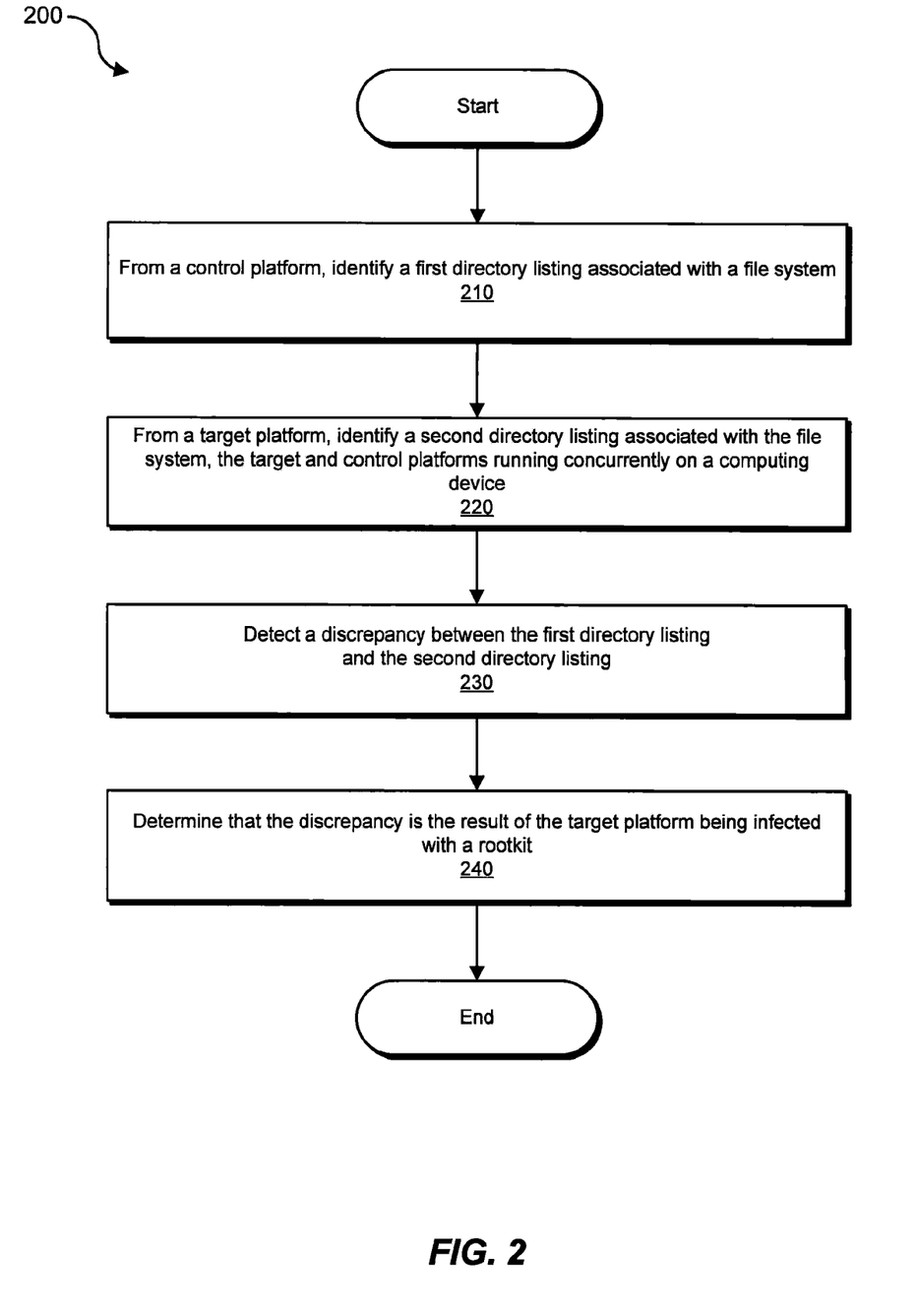
FIG. 2 is a flow diagram of an exemplary method for detecting rootkits according to certain embodiments.

FIG. 2 illustrates a method for detecting rootkits. The steps illustrated in FIG. 2 may be performed by a security module, such as rootkit-detection module 140 of FIG. 1. Steps shown in FIG. 2 may be performed by one module or by different modules. For example, one step of FIG. 2 may be performed locally on a client device while one or more other steps of FIG. 2 may be performed remotely on a security server.

A security module may identify, from a control platform, a first directory listing (step 210). The first directory listing may be associated with a file system. The directory listing may be a directory listing provided by an operating system in embodiments where the control platform is an operating system. Identifying the first directory listing may comprise reading a directory listing, uploading a directory listing, or otherwise accessing a list of files and file names or other files and directory information for files on the computing device through the control platform. The directory listing may be a directory listing of all or a portion of a file system on the computing device.

In some embodiments, identifying the first directory listing may comprise identifying a first file table of a volume through the control platform. For example, the security software may request that the first volume provide a first file table. Then, the security software may use the first file table to create the first directory listing. In some embodiments, the security software may map, interpret, or otherwise transform the first file table to create the first directory listing. Thus, identifying the first directory listing may comprise identifying the first file table and creating the first directory listing by using the first file table.

The security module may identify, from a target platform, a second directory listing (step 220). The second directory listing may be associated with the same file system as the first directory listing. In some embodiments, identifying the second directory listing may comprise identifying a second file table of a volume through the target platform and using the second file table to create the second directory listing. The control platform and the target platform may run concurrently on a computing device. In other words, the control platform and the target platform may be running at the same time as each other on the computing device.

After identifying the first and second directory listings, the security module may detect a discrepancy between the first directory listing and the second directory listing (step 230). As part of detecting the discrepancy between the first and second directory listings, the security module may compare the first directory listing with the second directory listing. If a file is hidden from the target platform, the discrepancy between the first directory listing and the second directory listing may be that the first directory listing identifies the file and the second directory listing does not identify the file.

In other embodiments, the discrepancy between the first directory listing and the second directory listing may be that a hash for a first file in the first directory listing does not match a hash for the first file in the second directory listing. Thus, as part of detecting a discrepancy between the first directory listing and the second directory listing, the security module may calculate a first hash for a first file through the control platform and a second hash for the first file through the target platform. If the hashes do not match, the security module may determine that a rootkit changed the file through the target platform.

The security module may compute the hash for the first file by using a hash function. The hash function may be a cyclic redundancy check (CRC) hash function. In other embodiments, the hash function may be a cryptographic hash function, such as a message-digest algorithm 5 (MD5) hash function. The hash function may also be a secure hash algorithm (SHA) cryptographic hash function, such as a sha-0, sha-1, sha-256, or sha-512 hash function. A hash of the first file may also be computed by applying any other public or private algorithm to the first file.

The security module may determine that the discrepancy is a result of the target platform being infected with a rootkit (step 240). The determination that the discrepancy is the result of the target platform being infected with a rootkit may be made by querying a server, such as a security server, to determine whether the hidden or changed files are part of a rootkit. In other embodiments, the security module may query an administrator, and determining that the discrepancy is a result of the target platform being infected with a rootkit may comprise receiving input from an administrator about whether the discrepancy is a result of a rootkit. In other words, the determining step may comprise querying an administrator and receiving a response from the administrator.

In some embodiments, the control platform may be a secure platform that runs directly on hardware (which may be trusted hardware) of the computing device, and the target platform may be an insecure operating system that communicates with the hardware of the computing device through the control platform. Thus, a rootkit may not be able to infect the control platform, but may be able to infect the target platform. Since a rootkit may not be able to infect the control platform, the control platform may be a good point of reference for determining whether the target platform is infected.

Figure 3:
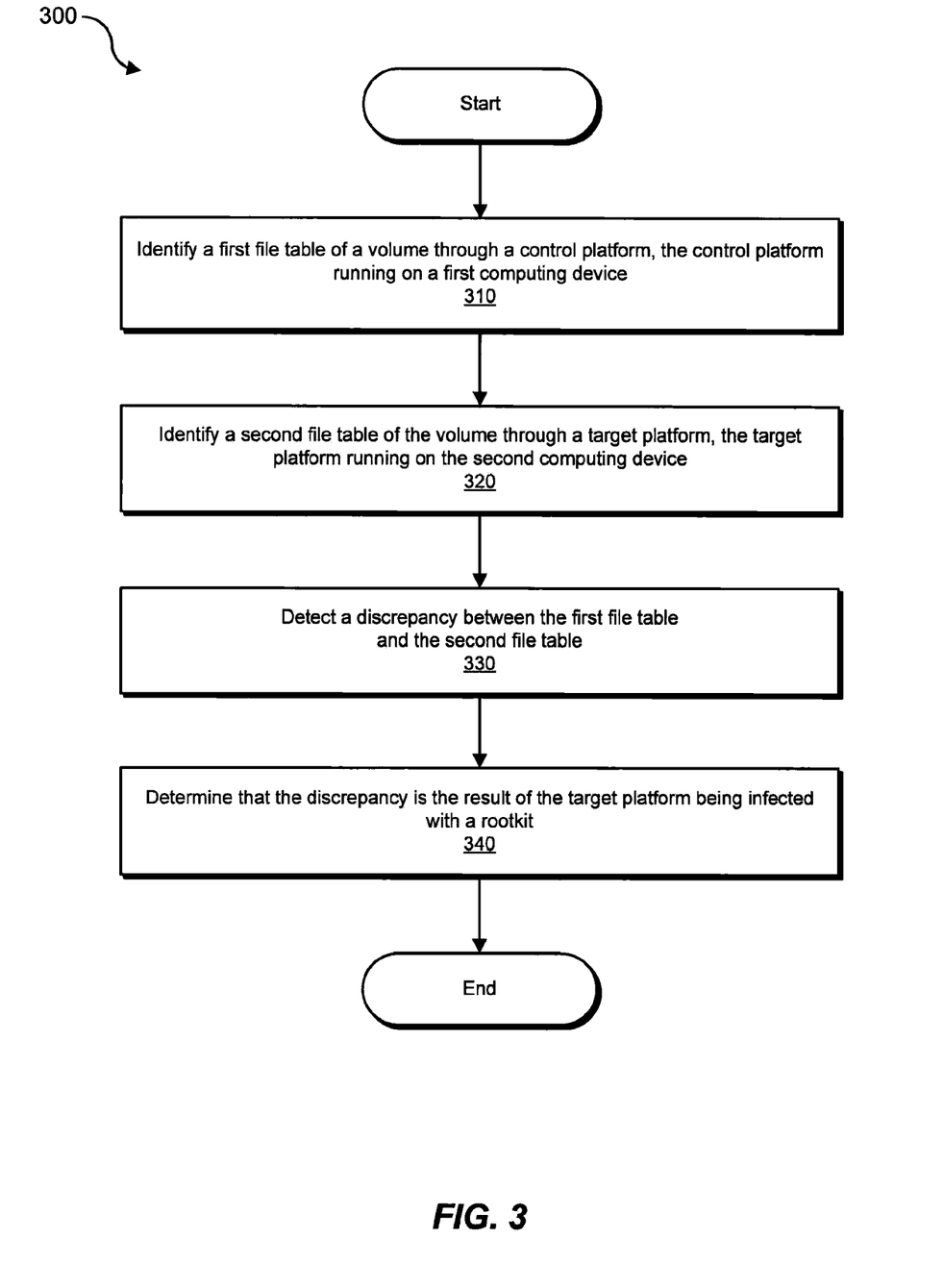
FIG. 3 is a flow diagram of another exemplary method for detecting rootkits.

FIG. 3 illustrates another example of detecting rootkits. The steps in FIG. 3 may be performed by a security module, such as rootkit-detection module 140 in FIG. 1. The security module may identify a first table of the volume through a control platform (step 310). The control platform may be running on a first computing device. The first table may be any table that identifies data on a volume. For example, the file table may be a master-file table, which is a file table that may contain metadata about each file, directory, and metafile on an NTFS volume. The master-file table may include file names, locations, sizes, and permissions.

The security module may identify a second file table of the volume through a target platform (step 320). The target platform may also be running on the first computing device. The security module may detect a discrepancy between the first file table and the second file table (step 330). The discrepancy may be a result of a rootkit manipulating an attempt to read the file table through the target platform or to access the file table through the target platform. In some embodiments, the discrepancy may be that one file table identifies a file that the other file table does not identify. According to various embodiments, the discrepancy may be that one or more of a file name, location, and/or size of a file in one file table does not match the file information in the other file table.

The security module may determine that the discrepancy is a result of the target platform being infected with a rootkit (step 340). The security module may then remove the rootkit. The security module may also perform various other security functions with respect to the rootkit. For example, the security module may report the rootkit to a security software company.

Figure 4:
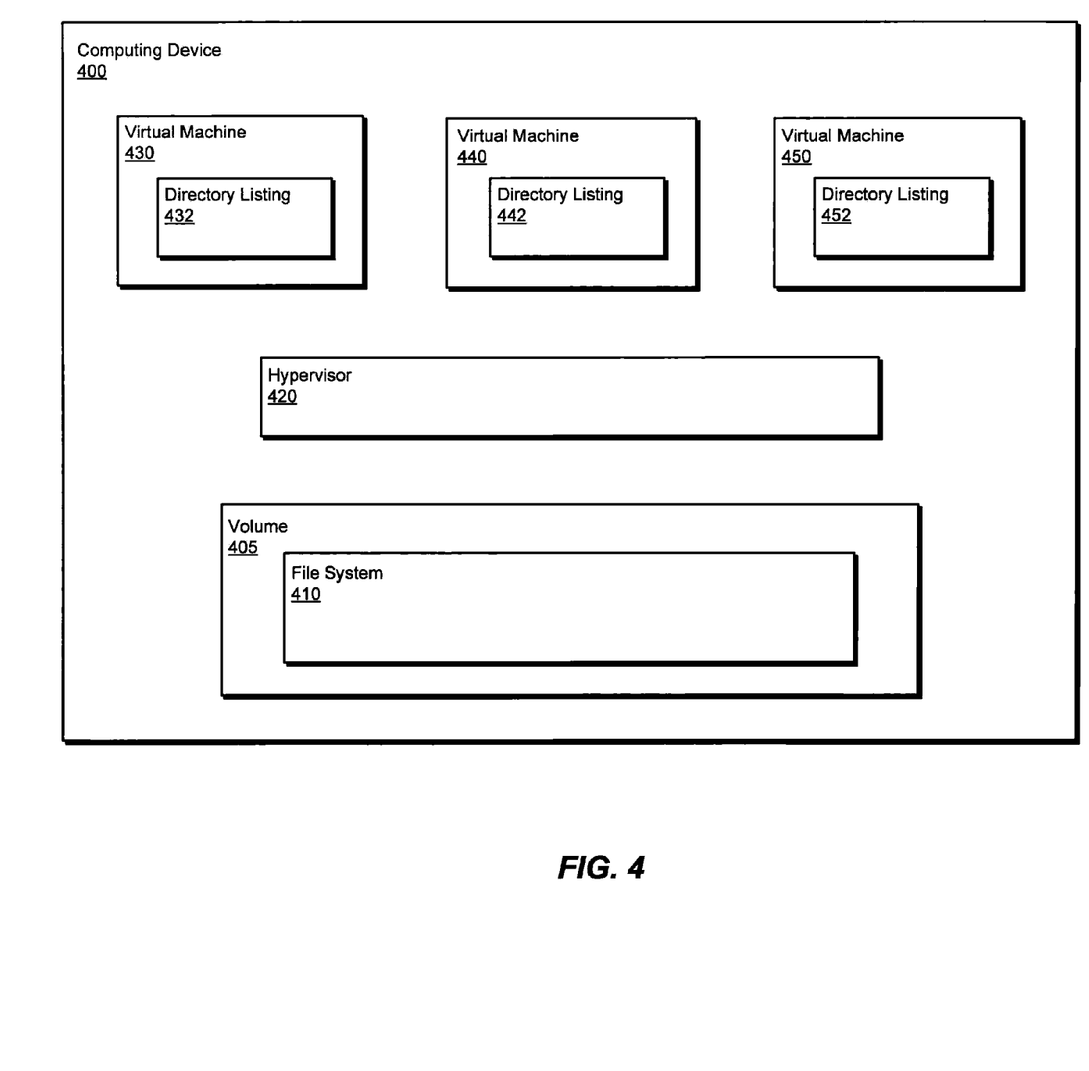
FIG. 4 is a block diagram of an exemplary computing device that illustrates how a rootkit may be detected according to certain embodiments.

FIG. 4 shows a computing device 400. Computing device 400 may include a volume 405, a hypervisor 420, and virtual machines 430, 440, and 450. Volume 405 may comprise a file system 410. Virtual machine 430 may include a directory listing 432, virtual machine 440 may include a directory listing 442, and virtual machine 450 may include a directory listing 452. Virtual machines 430, 440, and 450 may be managed by hypervisor 420.

In some embodiments, a rootkit-detection module located on a remote device (or on computing device 400) may compare one or more of directory listings 432, 442, and 452 to determine whether any one of virtual machines 430, 440, and 450 is infected with a rootkit. According to at least one embodiment, virtual machine 430 may be a secure virtual machine. Thus, rootkit-detection module may use virtual machine 430 as a reference point in determining whether virtual machine 440 or 450 is infected with a rootkit.

Figure 5:
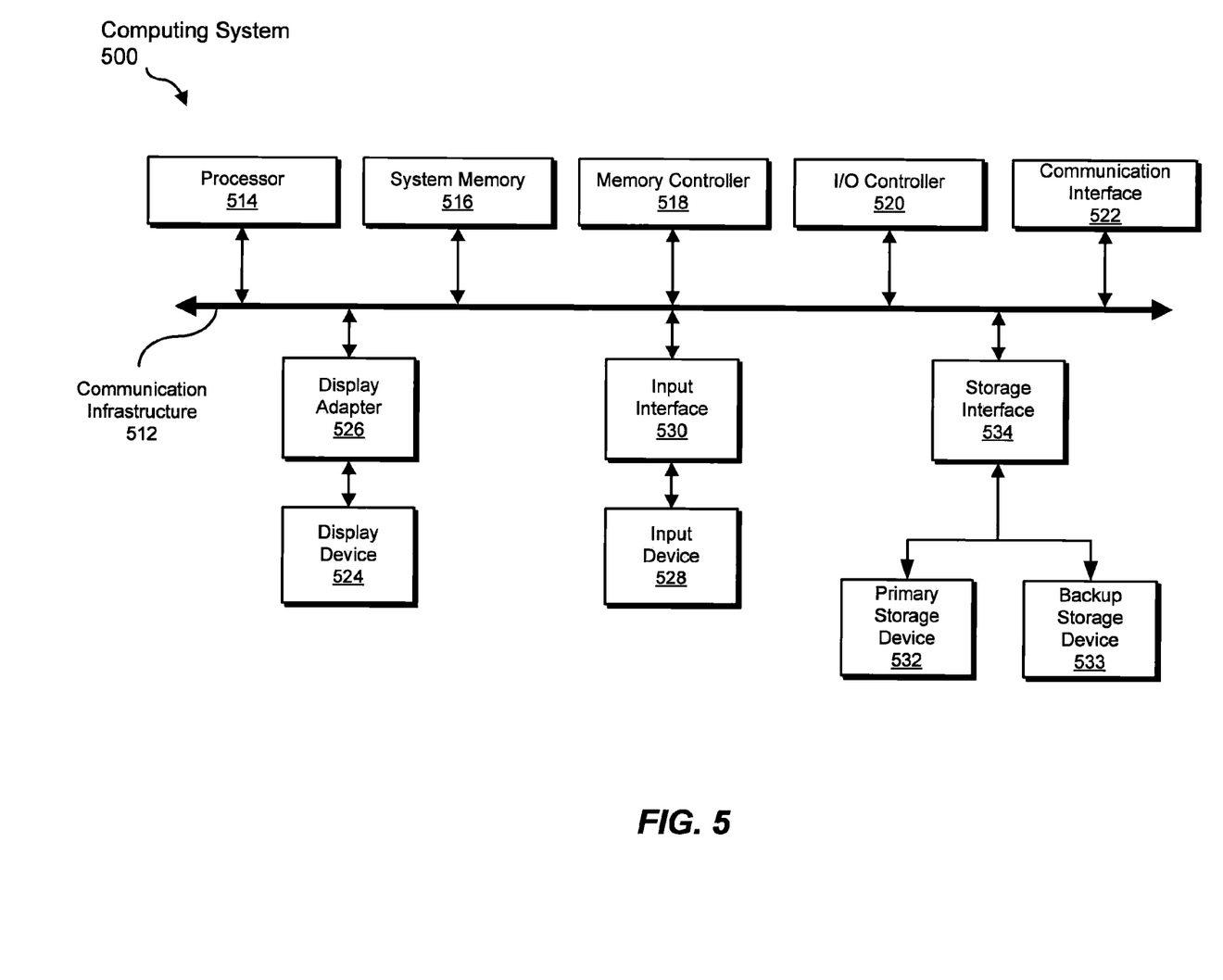
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, detecting, determining, and using steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (e.g., system memory 516) and a non-volatile storage device (e.g., primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, detecting, determining, and/or using.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, detecting, determining, and/or using steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, detecting, determining, and/or using steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, detecting, determining, and/or using steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing, either alone or in combination with other elements, one or more of the identifying, detecting, determining, and/or using steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
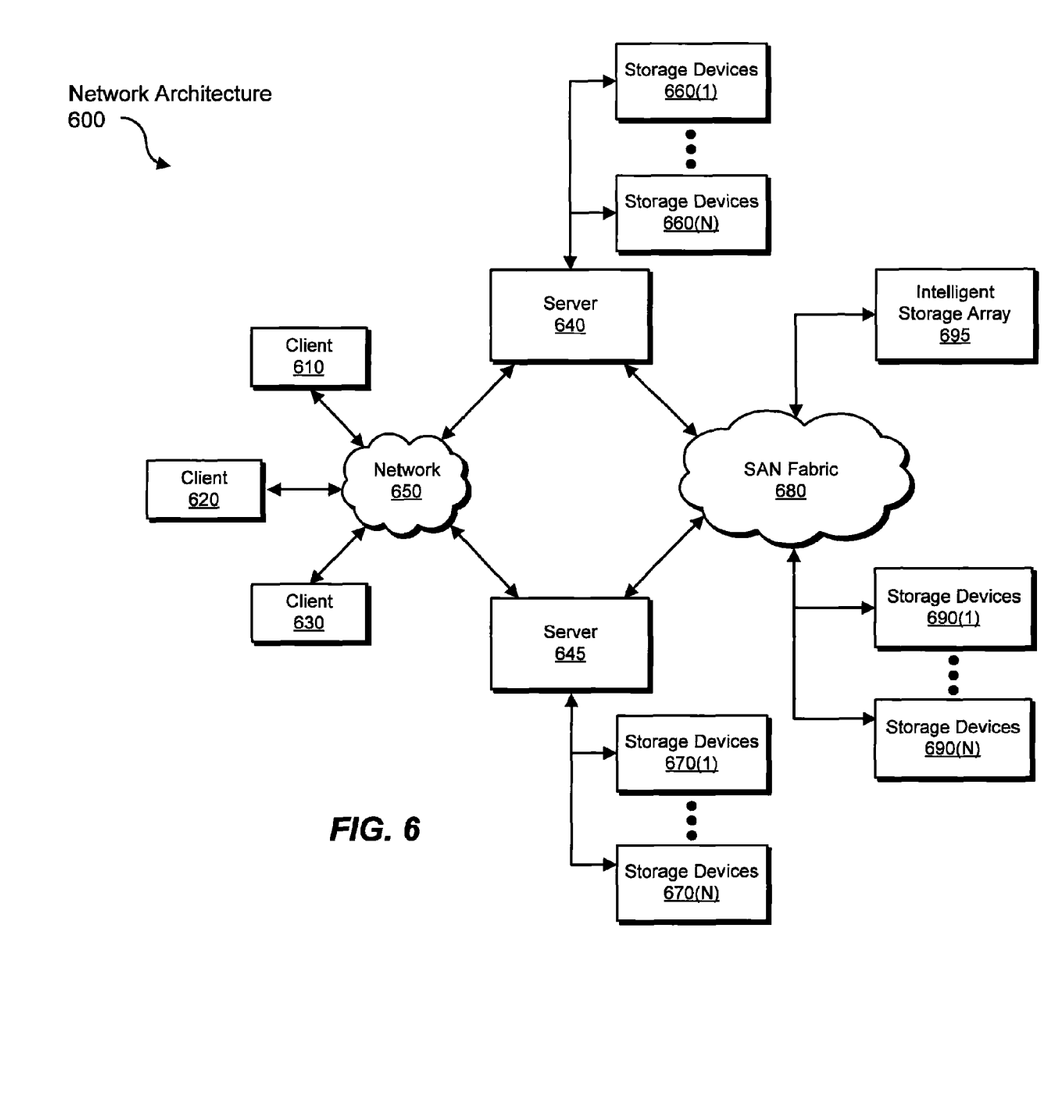
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, detecting, determining, and/or using steps disclosed herein. Network architecture 600 may also be used to perform and/or be a means for performing other steps and features set forth in the instant disclosure.

As detailed above, computing system 510 and/or one or more of components of network architecture 600 may perform and/or be a means for performing, either alone or in combination with other elements, one or more of steps of the exemplary methods described and/or illustrated herein. For example, a computer-implemented method may comprise identifying, from a control platform, a first directory listing. The first directory listing may be associated with a file system. The method may also comprise identifying, from a target platform, a second directory listing. The second directory listing may be associated with a file system. The control platform and the target platform may be running concurrently on a computing device. The method may further comprise detecting a discrepancy between the first directory listing and the second directory listing and determining that the discrepancy is a result of the target platform being infected with a rootkit.

In some embodiments, the first file may be hidden from the target platform. The discrepancy between the first directory listing and the second directory listing may be that the first directory listing identifies the first file and the second directory listing does not identify the first file.

In other embodiments, the discrepancy between the first directory listing and the second directory listing may be that a hash for the first file in the first directory listing does not match a hash for the first file in the second directory listing.

In some embodiments, the control platform may be a host operating system and the target platform may be a guest operating system. According to various embodiments, the target platform may be a virtual machine and the control platform may be a hypervisor programmed to manage the virtual machine. In certain embodiments, the control platform may be a secure software platform that runs directly on hardware of the computing device. The target platform may be an insecure operating system that communicates with the hardware of the computing device through the control platform. In some embodiments, both the target platform and the control platform may be virtual machines.

According to at least one embodiment, the first directory listing may be a listing of a portion of directories and files in the file system. In other embodiments, the first directory listing may be a listing of all the files in the file system. In the embodiment where the listing is a portion, the second directory listing may also be a listing of the same portion of directories and files in the file system. In embodiments where the first directory listing is a listing of all the files in the file system, the second directory listing may be a listing of all the files in the file system. According to various embodiments, the method may also comprise removing the rootkit.

In some embodiments, identifying the first directory listing may comprise identifying a first file table of a volume through the control platform and using the first file table to create the first directory listing. According to various embodiments, identifying the second directory listing may comprise identifying a second file table of a volume through the target platform and using the second file table to create the second directory listing.

In certain embodiments, a computer-implemented method for detecting rootkits may comprise accessing a first file table of a volume through a control platform. The control platform may run on a first computing device. The method may also comprise accessing a second file table of the volume through a target platform. The target platform may run on the computing device. The method may comprise detecting a discrepancy between the first file table and the second file table and determining that the discrepancy is the result of the target platform being infected with a rootkit. In some embodiments, the volume may comprise an NTFS-formatted volume and the first and second file tables may be master-file tables.

According to at least one embodiment, the discrepancy may be a result of a rootkit manipulating an attempt to read a file table of a volume through the target platform. In some embodiments, the discrepancy may be that the first file table does not match the second file table.

According to various embodiments, the control platform may be a secure software platform that runs directly on hardware of the computing device and the target platform may be an insecure operating system that communicates with the hardware of the computing device through the control platform. In various embodiments, the control platform may be a first virtual machine and the target platform may be a second virtual machine. The method may further comprise removing the rootkit.

According to certain embodiments, a computer-readable medium may comprise one or more computer-executable instructions that, when executed by a computing device, may cause the computing device to identify, from a control platform, a first directory listing. The first directory listing may be associated with a file system. The computer executable instructions may also cause the computer to identify, from a target platform, a second directory listing. The second directory listing may be associated with the file system. The control platform and the target platform may be running concurrently on a computing device. The computer-readable medium may also detect a discrepancy between the first directory listing and the second directory listing and determine that the discrepancy is the result of the target platform being infected with a rootkit.

In some embodiments, the first file may be hidden from the target platform and the discrepancy between the first directory listing and the second directory listing may be that the first directory listing identifies the first file and the second directory listing does not identify the first file. In some embodiments, the discrepancy between the first directory listing and the second directory listing is that a hash for the first file in the directory listing does not match a hash for the first file in the second directory listing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with, and have the same meaning as, the word "comprising."

We claim:

1. A computer-implemented method, at least a portion of the computer-implemented method being performed by a computing system comprising at least one processor, the computer-implemented method comprising: detecting a rootkit that is able to hide files from attempts to map a volume formatted in a New technology File System (NTFS) format; from a control platform, identifying a first directory listing associated with a file system of the volume, the control platform being a secure software platform that runs directly on trusted hardware of a computing device; from a target platform, identifying a second directory listing associated with the file system of the volume, the control platform and the target platform executing in parallel on a computing device, the target platform being an insecure operating system that communicates with the hardware of the computing device through the control platform; detecting a discrepancy between the first directory listing and the second directory listing; determining that the discrepancy is the result of the target platform being infected with the rootkit that is able to hide files from the attempt to map the volume; removing the rootkit.

2. The computer-implemented method of claim 1, wherein:
a first file is hidden from the target platform;
the discrepancy between the first directory listing and the second directory listing is that the first directory listing identifies the first file and the second directory listing does not identify the first file.

3. The computer-implemented method of claim 1, wherein:
the discrepancy between the first directory listing and the second directory listing is that a hash for a first file in the first directory listing does not match a hash for the first file in the second directory listing.

4. The computer-implemented method of claim 1, wherein detecting the discrepancy comprises;
computing the hash for the first file in the first directory listing using a secure hash algorithm;
computing the hash for the first file in the second directory listing using the secure hash algorithm;
determining that the first hash does not match the second hash.

5. The computer-implemented method of claim 1, wherein:
the target platform is a virtual machine;
the control platform is a hypervisor programmed to manage the virtual machine.

6. The computer-implemented method of claim 1, wherein:
determining that the discrepancy is the result of the target platform being infected with the rootkit comprises looking further into the discrepancy by querying a security server to determine whether a file that gave rise to the discrepancy is part of the rootkit.

7. The computer-implemented method of claim 1, wherein:
the computing system that performs at least a portion of the computer-implemented method is located remote from the computing device on which the control platform is running.

8. The computer-implemented method of claim 1, further comprising:
identifying the first directory listing by identifying a master file table of the NTFS volume through the control platform and transforming the first file table to create the first directory listing;
identifying the second directory listing by identifying the master file table of the NTFS volume through the target platform and transforming the second file table to create the second directory listing;
reporting the rootkit to a security software vendor.

9. The computer-implemented method of claim 1, wherein:
the secure software platform is not vulnerable to infection from rootkits and provides a reference point for determining whether the target platform is infected with the rootkit.

10. The computer-implemented method of claim 1, wherein determining that the discrepancy is the result of the target platform being infected with the rootkit comprises looking further into the discrepancy by:
querying an administrator about the discrepancy;
receiving input from the administrator indicating that the discrepancy is the result of the target platform being infected with the rootkit.

11. The computer-implemented method of claim 1, wherein identifying the first directory listing comprises:
identifying a master file table of the volume through the control platform;
mapping the master file table of the volume to create the first directory listing.

12. The computer-implemented method of claim 1, wherein identifying the second directory listing comprises:
identifying a master file table of the volume through the target platform;
mapping the master file table of the volume to create the second directory listing.

13. A computer-implemented method for detecting rootkits, at least a portion of the computer-implemented method being performed by a computing system comprising at least one processor, the computer-implemented method comprising:
identifying a first directory listing of a file system of a volume through a control platform, the control platform comprising a secure virtual machine running on a first computing device;
identifying a second directory listing of the file system of the volume through a target platform, the target platform comprising another virtual machine running on the first computing device;

detecting a discrepancy between the first directory listing and the second directory listing;

determining that the discrepancy is the result of the target platform being infected with a rootkit that manipulates attempts to read the volume.

14. The computer-implemented method of claim 13, wherein:

the control platform comprises a reference point for determining whether the target platform and an additional target platform are infected with rootkits;

the additional target platform comprises a third virtual machine running on the first computing device.

15. The computer-implemented method of claim 14, further comprising:

identifying a third directory listing of the file system of the volume through the additional target platform;

comparing the third directory listing with the first directory listing to determine whether the additional target platform is infected with a rootkit that manipulates attempts to read the volume.

16. The computer-implemented method of claim 14, wherein:

the computing device comprises a hypervisor that manages the control platform, the target platform, and the additional target platform.

17. The computer-implemented method of claim 13, wherein:

rootkits are unable to infect the control platform because the control platform comprises the secure virtual machine.

18. A non-transitory computer-readable medium comprising one or more computer-executable instructions that, when executed by a computing device, cause the computing device to: form a secure control platform that cannot be infected with rootkits, identify a first directory listing associated with a file system; from a target platform, identify a second directory listing associated with the file system, the control platform and the target platform executing in parallel on a computing device; detect a discrepancy between the first directory listing and the second directory listing; determine that the discrepancy is the result of the target platform being infected with a rootkit.

19. The computer-readable medium of claim 18, wherein:
a first file is hidden from the target platform;
the discrepancy between the first directory listing and the second directory listing is that the first directory listing identifies the first file and the second directory listing does not identify the first file.

20. The computer-readable medium of claim 18, wherein:
the discrepancy between the first directory listing and the second directory listing is that a hash for a first file in the first directory listing does not match a hash for the first file in the second directory listing.

* * * * *